A. SEAVER.

Stay for Boots and Shoes.

No. 8,606. Reissued Mar. 4, 1879.

Attest,
N. H. A. Knight
Wm. Blackstock.

Augustus Seaver
Inventor,
by Wright & Brown
Attorneys.

N. PETERS, PHOTO-LITHOGRAPHER, WASHINGTON, D. C.

UNITED STATES PATENT OFFICE.

AUGUSTUS SEAVER, OF BOSTON, MASSACHUSETTS.

IMPROVEMENT IN STAYS FOR BOOTS AND SHOES.

Specification forming part of Letters Patent No. 208,339, dated September 24, 1878; Reissue No. 8,606, dated March 4, 1879; application filed January 20, 1879.

*To all whom it may concern:*

Be it known that I, AUGUSTUS SEAVER, late of Milford, in the county of Worcester, but now of Boston, in the county of Suffolk, and State of Massachusetts, have invented certain Improvements in Stays for Boots and Shoes, of which the following is a specification:

This invention has for its object to provide a cheap, serviceable, and durable seam-covering stay for boots and shoes; and it consists in a leather stay lined with cloth, the cloth lining being cemented to the leather, arranged to be secured to the boot or shoe by the stitches that secure the leather, and imparting to the stay the advantages which I will now proceed to describe.

Figure 1:
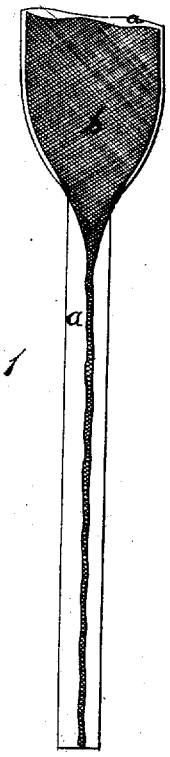
Figure 2:
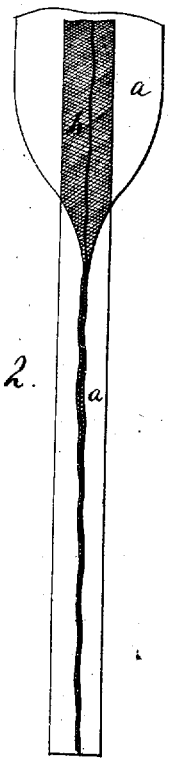

Of the accompanying drawings, forming part of this specification, Figure 1 represents a view of the inner side of a stay embodying my invention, one end being unfolded to show the cloth lining. Fig. 2 represents a similar view, showing a modification of the method of connecting the leather to the lining.

In carrying out my invention I employ any suitable kind of leather, preferably kid, as the outer layer of the stay, and apply to the inner side of the leather a lining or inner layer of any suitable kind of cloth, preferably drilling, connected firmly to the leather by cement.

I prefer to make the stay in the following manner, viz: I prepare the leather portion from a number of pieces, as scrap or waste, by cementing or otherwise joining together any desired number of strips to form a continuous leather band or ribbon about half an inch wide, the dressed surface of the leather being on the same side throughout the entire length of the piece. I then cement a continuous strip of cloth to the back or undressed side of the leather strip, and then fold the edges of the combined cloth and leather strip to make a folded stay of the usual form, the folded edges being cemented to the central portion in the usual manner.

The stay thus made is shown in Fig. 1, in which *a* represents the leather, and *b* the cloth lining.

If desired, the cloth may be folded separately, and the leather subsequently cemented to, and, if desired, wrapped or folded on, the folded cloth, as represented in Fig. 2, in which case the cloth forms a guide or gage, serving to make sharply-defined edges in folding over the leather.

It is essential that the cloth be arranged to cover the back side of the leather, so that the stitches that secure the stay to the boot or shoe shall necessarily pass through both cloth and leather, the two layers being thus securely united without depending entirely upon the cement.

I do not desire to limit myself to any special mode of operation in making the stay, as any practical method of cementing the parts together and folding the edges may be practiced.

The stay possesses the following advantages over a stay composed wholly of leather: First, it is almost entirely inelastic, and will not stretch and become distorted; second, it is exceedingly strong, and cannot be easily pulled apart at any point, especially where the strips of leather are joined together in making a long ribbon or piece, whereas, without the cloth, there would be liability of the joints giving way, particularly when a joint occurs at a point in the stay where there is more movement or wrinkling than elsewhere; third, it will endure creasing and wrinkling much longer than the ordinary leather stay without breaking or cracking, as the firm and intimate union between the cloth and the leather produced by cementing and stitching enables the cloth to support the leather in such manner as to prevent the latter from breaking where it is wrinkled; fourth, a cheap and inferior quality of leather can be employed, so that a good and durable stay can be produced at a low cost, the expense of the cloth being very slight; fifth, the cloth may be in a continuous strip throughout the entire length of the piece, so that it will virtually make the leather continuous, or of uniform strength throughout, regardless of the number of joints or splices in the leather.

The cloth also enables the ends of the lengths of leather to be scarfed and united without making unsightly protuberances where the ends are lapped.

I claim as my invention—

A seam-covering stay for boots and shoes, composed of an outer layer of leather and an inner layer of cloth cemented to the leather, the cloth arranged to cover one side of the leather, so that the stitches that secure the leather to the boot or shoe shall necessarily pass through the cloth, as set forth.

AUGUSTUS SEAVER.

Witnesses:
JOHN G. MCCARTER,
C. F. BROWN.